United States Patent [19]

Gralak

[11] 3,974,295
[45] Aug. 10, 1976

[54] PROCESS FOR PREPARING PROTEIN SUPPLEMENTED, FLAVORED INSTANT GRITS

[75] Inventor: Bruce G. Gralak, Carpentersville, Ill.

[73] Assignee: The Quaker Oats Company, Chicago, Ill.

[22] Filed: Jan. 8, 1975

[21] Appl. No.: 539,264

Related U.S. Application Data

[63] Continuation-in-part of Ser. No. 408,863, Oct. 23, 1973, abandoned.

[52] U.S. Cl. .............................. 426/72; 426/620; 426/640; 426/541; 426/658; 426/641
[51] Int. Cl.² .......................................... A23L 1/30
[58] Field of Search ............ 426/72, 543, 619, 640, 426/641, 541, 543, 656, 658, 650, 408, 863

[56] References Cited
UNITED STATES PATENTS 3,391,001  7/1968  Sair ..................................... 426/656
3,615,656  10/1971  Alden .................................. 426/533
3,642,490  2/1972  Hawley ............................... 426/459
3,664,846  5/1972  Hyldon ............................... 426/620
3,711,301  1/1973  Asogawa et al. ..................... 426/92

Primary Examiner—Raymond N. Jones
Attorney, Agent, or Firm—Mathew R. P. Perrone, Jr.; Donnie Rudd

[57] ABSTRACT

Emulsifier free instant-type corn grits food product are prepared by: (A) admixing corn grits, water, polysaccharide gum and vitamins and antioxidant; (B) heating the mixture in a first heating step; (C) heating the above heated mixture in a second heating step which consists of a critical temperature range; (D) drying the mixture by forming the heated mixture in a thin sheet on a drum drier with the forming being conducted within a critical time period from the last heating step; (E) comminuting the cooked, dried sheet; and blending with a specially prepared moist proteinaceous flavoring agent to form a unique dry mixture.

9 Claims, No Drawings

PROCESS FOR PREPARING PROTEIN SUPPLEMENTED, FLAVORED INSTANT GRITS

CROSS REFERENCE TO RELATED APPLICATIONS

This application is a continuation-in-part of patent application Ser. No. 408,863, filed Oct. 23, 1973, now abandoned.

BACKGROUND OF THE INVENTION

1. Field of the Invention:

This invention pertains to a process for producing an improved instant food product of the protein supplemented, flavored corn grits type and the product produced by such process.

2. DESCRIPTION OF THE PRIOR ART:

An instant corn grits product has been disclosed by U.S. Pat. No. 3,664,846. The present invention discloses a way of greatly increasing the flavor of such a product while at the same time providing added nutritional value in the form of protein supplementation and vitamin content.

SUMMARY OF THE INVENTION

It is an object of this invention to produce a protein supplemented, flavored instant corn grits product which may be prepared as highly nutritious, flavored corn grits by the mere addition of warm water to the product in a serving bowl.

It is another object of this invention to provide an instant grits product which upon the addition of warm acquires the texture and flavor characteristics of blends of conventional corn grits and other products.

It is still a further object of this invention to provide a process for providing a protein and vitamin supplemented, flavored instant corn grits product.

These objects are accomplished by a process which comprises admixing corn grits, critical amounts of water, and critical amounts of polysaccharide gum; vitamins and antioxidant, heating the mixture in a first heating step to a temperature of from 60°C. to 80°C. and maintaining that temperature for a period of time from 30 seconds to 30 minutes providing, however, that the heating does not "set" the starch, i.e. does not substantially gelatinize the starch, heating the above heated mixture in a second heating step at a temperature of from 93°C. to 100°C. and within two minutes of the time that the second heating step has been accomplished, drying the heated mixture in the form of a thin sheet on a drum drier; collecting the dried sheet of product and comminuting it to form an instant-type corn grits product; preparing a moist proteinaceous material, and blending the grits with specified amounts of a proteinaceous flavoring material to form a dry mixture.

More particularly, the polysaccharide gums used in this invention must be capable of hydrating rapidly with the addition of water and must be edible. Edible polysaccharide gums include both true gums of vegetable origin and synthetic gums such as carboxymethylcellulose, methyl cellulose, and other cellulose derivatives which approximate the vegetable gums in physical and chemical properties. Both types of gums are acceptable for use in this invention.

"True gums" are gums of vegetable origin which are soluble in water or swell in contact with water to form viscuous colloidal solutions. They are insoluble in oils, alcohol, benzene and other organic solvents.

A general classification of such gums is as follows:

A. Plant gums — dried extrudates from certain trees or shrubs in the form of tears, flakes or annular fragments that have been formed by bark fissures or incisions. The more important ones include acacia (gum arabic), Australian, Cape, carmania, gedda, ghatti, karaya, mesquite, mogadore, Persian, shiraz, talha and tragacanth. Others of lesser importance include amrad, angico, apricot, brea, cashew, cebil, cedar, chagual, cherry, damson, jeol, mango, plum and sassa.

B. Plant mucilages — derived from seeds, roots or other plant parts usually by extraction with water. The class includes gums derived from althea root, chia seed, Iceland moss, linseed (flaxseed), slippery elm bark and guar gum.

C. Mucilaginous materials known as hydrophylic colloids obtained from two general groups of brown and red algae. This class includes agar, Irish moss (carrageen) and algin.

When the source material for the gum is acidic i.e., algin and Irish moss, the commercially available edible gum is a derivative of the acid such as a soluble salt or ester, i.e. propylene glycol ester of alginic acid in general, to be satisfactory, any gum employed must be edible, have no undesirable flavor, and disperse rapidly in hot water.

The concentration of the polysaccharide gum is critical. The polysaccharide gum must be present in an amount of from 0.5 to 3.5 percent by weight of the finished corn grits product and preferably from 1.0 to 3.0 percent by weight of the finished corn grits product.

It is contemplated, alternatively, that mixtures of the aforementioned gums may be employed instead of a single gum as long as the critical levels of gum are maintained. The objects of this invention are further accomplished by a process for producing a fortified nutritional emulsifier free, instant-type food product which upon the addition of water and without need for heating to boiling temperatures acquires the flavor and texture characteristics of cooked corn grits, said process consisting of the steps:

A. admixing
  1. corn grits;
  2. water, said water being added in an amount sufficient to cause the moisture content to be from 50 percent to 90 percent by weight of the total mixture;
  3. an edible polysaccharide gum capable of rehydrating rapidly with the addition of water, said gum being added in an amount of from 0.5 to 3.5 percent by weight of the finished corn grits product; and
  4. a mixture of vitamins and antioxidant until the total admixture is a slurry;
B. heating the above mixture in a first heating step, said first heating step comprising heating the mixture to a temperature of from 60°C. to 80°C. and maintaining that temperature for a period of time of from 30 seconds to 30 minutes without substantially gelatinizing the starch in the corn grits;
C. heating the above heated mixture in a second heating step, said second heating step comprising heating the mixture to a temperature of from 93°C. to 100°C.;

D. drying the heated mixture in the form of a thin sheet on a drum drier, said drying being substantially accomplished within a time period of up to 2 minutes after the mixture has been heated to the 93°C. to 100°C. temperature range;

E. collecting the dried sheet of product containing discrete particles in a starch-gum matrix and comminuting the dried sheet to form an instant-type corn grits product; and F. forming a moist proteinaceous flavoring material by admixing: 1.) a proteinaceous material having more than 15 percent by weight protein therein, 2.) salt, and 3.) a moisturizing gravy mix; and G. blending the moist proteinaceous flavoring material with the comminuted dry sheet until the blend is dry and with said proteinaceous flavoring material being added in an amount of from 1 percent to 15 percent by weight of the blended product.

The elimination of an emulsifier in this new process is accomplished by the two step heat treatment procedure prior to placing the product on a drum drier. The first heating step of my process comprises heating the mixture to a temperature of from 60°C. to 80°C. and preferably from 60°C. to just under 71°C. and maintaining that temperature for a period of time of from 30 seconds to 30 minutes without setting the starch in the corn grits. It is necessary that this heat treatment be accomplished within the required temperature range for the required time period before proceeding to the second heating step. If the temperature range is exceeded before the time limitation has been achieved, then the mixture will not have the properties sufficient to allow it to be formed into a thin sheet on a drum drier.

It is also necessary that the first heating step does not "set" the starch in the corn grits. By use of the term "set" with regards to the starch in the corn grits, it is intended to mean a cooking of the starch to the point that it becomes an extremely thick or hardened mass. In other words, the first heating step must not substantially gelatinize the starch.

In the second heating step of this new process the above heated mixture is heated to a temperature within the range of from 93°C. to 100°C. After the second heating step is accomplished, it is critical that the heated mixture be conveyed immediately, i.e. within a time period of up to two minutes, to a drum drier and substantially dried on the drum drier within the two minute time period. It is to be understood that while some of the grits particles may theoretically never go through the nip of the drum drier, it is only sufficient that a substantial portion, i.e. greater than 80 percent of the mixture, be dried within the two minute time period.

The second heating step of this process may be accomplished in one of two ways. The preferred procedure is to have an independent heating step such as injecting steam into the mixture to raise the temperature to the require temperature range. The heating mixture is then passed immediately to the trough portion of a drum drier and substantially dried within two minutes after the mixture has been heated to the temperature range. An alternate procedure for accomplishing the second heating step of this invention is accomplished by conveying the mixture from the first heating step directly to the trough portion of a drum drier and heating the mixture in the trough portion of the drum drier to the temperature range of from 93°C. to 100°C. and then after a substantial portion of the mixture has been heated to the required temperature range, passing the mixture through the nip of the drier within two minutes of the time that a substantial portion of the mixture has reached the required temperature range.

Any of the commercially available comminuting machines are acceptable for comminuting the cooked and dried sheet of discrete particles in a starch-gum matrix. It is preferred, however, that the comminution be such that the product has the following particle size distribution according to a Ro-Tap particle size distribution analysis:

10 Minutes on Ro-Tap
(No. refer to U.S. Sieve numbers)
(% refers to weight percent)

| | |
|---|---|
| On a No. 12 | Less than 1% |
| Through a No. 12 and on a No. 16 | 17% to 25% |
| Through a No. 16 and on a No. 20 | 37% to 43% |
| Through a No. 20 and on a No. 30 | 14% to 19% |
| Through a No. 30 and on a No. 40 | 4% to 7% |
| Through a No. 40 | Less than 20% |

While the above is a preferred particle size distribution for the comminuted product, any particle size distribution which will give approximately the same hydration rate as the above distribution will be acceptable.

In addition to making my product instant in nature, this unique process has awarded me several other benefits. First, the combination of thickening agent and critical temperature range provides a mixture which will form a sheet on a drum drier. By "drum drier" it is intended to mean any endless plate which can be heated from a side opposite the side contacted by the product. A good example of a drum drier which may be used in this new process may be found in U.S. Pat. No. 3,478,439. Normally, one would not attempt to use a drum drier to dry a mixture of discrete particles in a starch-gum matrix. This is so because the discrete particles would cause voids or tears in the attempted sheet, resulting in an uneven mass rather than a thin, continuous and consistent sheet which would be subjected to uniform drying and heat treatment. This unique combination of additives has made possible the drying of the product on a drum drier which gives the desired properties of my product.

By the term "drying" as used herein, it is intended to mean reducing the water content to below 15 percent by weight.

The product, as formed on the drum drier, preferably has a thickness of from 0.015 to 0.030 inch. This can be accomplished by setting the space between the drums at from 0.15 to 0.030 inch.

Another distinct advantage of this process is that it is successful for corn grits from a wide variety of sources. Ordinarily, corn grits vary in makeup (fat content, etc.) depending on the location from which they are produced and the processing employed in making the grits. As a result of this, processes involving corn grits normally require major alteration to adjust to the changes in the grits. No adjustment is necessary for this process regardless of the size or particle size distribution of the corn grits. While some prior processes have used an emulsifier to overcome problems associated with particle size distribution of the grits, this costly and time consuming step has been made unnecessary by my new and unique process.

Still another advantage of my new combination of additives becomes apparent after the product is prepared for use. When conventional corn grits are prepared in large quantities and stored on a steam table or the like to keep them warm until serving, they soon become an adhesive mass or cake and lose the texture associated with grits. This new process, however has provided a corn grits product wherein the forming of an adhesive mass or cake is postponed several hours. This results in a product which retains the grits texture for the longest of normal serving times for the product.

By the term "corn grits" in reference to this new improved food product it is intended to refer to particles of the endosperm of corn which have been subdivided to the extent that not less than 95 percent by weight of the particles pass through a No. 10 sieve and not more than 20 percent by weight of the particles pass through a No. 25 sieve.

By the term "instant" in reference to this food product, it is intended to refer to a product which be prepared in a bowl by mere addition of water and without a cooking step by the consumer. Thus provided is a product which eliminates the cooking pan and extensive cooking time requested for conventional corn grits. While room temperature water (about 25°C.) can be added to my product to rehydrate it, it is preferred to use boiling water as this requires less time and provides a product at the temperature normally preferred.

The product of this invention is different from the product made by inclusion therein of emulsifiers. This difference is most dramatically illustrated by a comparison of the density of the two products. If the process uses emulsifiers to obtain a product, the volume of a normal 24 gram serving of the grits (before water is added to the bowl) will be about ¼ cup which is a density of about 1536 grams per gallon. The product produced by this new process, however, has a volume of about ⅓ cup for a 24 gram serving which is a density of about 1152 grams per gallon. This new product is therefore about 25 percent less dense than prior known products.

This new and unique process results in a product which cannot be produced as economically by any other method. Simple mixing of the ingredients fails to produce an acceptable product. Likewise, simple mixing of the ingredients and cooking in a pan or over fails to produce an acceptable product. Also, this new and unique process eliminates the many problems associated with the necessary inclusion in the prior art of critical amounts of carefully controlled emulsifiers. This invention thus provides a new and useful product which can be produced only by this new and unique process.

This new and unique flavored product comprises a blend of the hereinabove described instant grits product with a moist, proteinaceous flavoring material. The moist, proteinaceous flavoring material comprises from 1–15 percent by weight of the blended product and the proteinaceous flavoring material has at least about 15 percent by weight protein therein. The proteinaceous flavoring material of this invention is moist. That is, it contains up to at least about 15 percent by weight moisture therein rather than being substantially dry, i.e. below 5 percent by weight moisture. It is preferable in this invention to use a vegetable protein material flavored with a meaty flavor. Primarily of importance are the hydrolyzed vegetable proteins impregnated with meaty flavors. For instance, the proteinaceous material can be prepared by mixing a blend of commonly known imitation bacon pieces with a redeye gravy mix and then with salt and mixing this mixture with the grits. Textured vegetable proteins impregnated with bacon or ham flavor are particularly useful in this invention. For use in this invention the proteinaceous material that is impregnated with a meat flavor or other proteinaceous material is mixed with salt and with a gravy. The gravy can be a redeye gravy mix which is a dried gravy with added smoked flavor, or in the case of added uncooked cheese or other such material, the gravy mixture can simply be water and starch or any moisturizing food material. Of great importance in this invention is the use of uncooked cheese as an additive. In this case the cheese cannot be cooked prior to being dry blended. When cheese is used it is crumbled and water added along with salt for moisture and mixing and then this is dry blended with the grits material to give an overall mixture. The limitations on the product are clearly defined. The flavoring ingredient must be about 1 percent by weight in order to provide sufficient flavoring in the material but it must not exceed about 15 percent by weight because it changes the texture characteristics if it gets too high. In addition, the product must be flavored with a material that imparts at least a sufficient amount of protein therein. It is required in this product that the additive portion of the product have at least 15 percent by weight protein therein. Textured vegetable proteins or hydrolyzed vegetable proteins commonly on the market generally have about 30 percent by weight protein therein although concentrates may have a much higher percentage of protein. The percentage of protein in cheese products is dependent upon the type cheese used and generally any cheese is acceptable so long as it meets the criteria and is uncooked.

Overall, the moist gravy material adds moisture to the proteinaceous material which as a moist material is then dry blended until the overall instant product is dry. The resultant product is a high quality, proteinaceous material that is very highly acceptable as a food product.

The corn grits, water and polysaccharide gum are mixed with a mixture of vitamins and antioxidant in preparation of the product of this invention. It is necessary that the vitamins be admixed prior to the slurrying of the material in order to get a thorough mixture of the vitamins therein. Acceptable vitamins are vitamins C, A, and the B complexes as well as other vitamins used for supplementation of food products. Iron and other certain minerals may also be added. It is necessary, however, that any of the vitamins be mixed with an effective amount of antioxidant in order to prevent their oxidation and rancidity or decomposition in the heating step of the process. Of particular importance as antioxidants in this invention are BHA and BHT.

The unusual advantages of this process and the unique feature thereof is that the process requires that the vitamins be admixed prior to the heating step, a step which normally one would think should be at the end of the process to prevent degradation of the vitamins. On the other hand, the proteinaceous material must be prepared separately and independently as a moist product and then blended to give a dry product at the end. It is in no way obvious to give the reverse adding of vitamins at the first of the process and the protein at the end of the process and this discovery has made this new and unique invention important. It is important that the adding of the vitamins and the proteinaceous material not be in anyway deviated from or else a poor product will exist.

This new and unique product can only be described by relation to the new and unique process which has been discovered. This new product, therefore, may best be described as the product produced by this new process.

DESCRIPTION OF PREFERRED EMBODIMENTS

This invention will be further illustrated but is not limited by the following examples and preferred embodiment. Example 1 may be taken to constitute the preferred embodiment of this invention.

EXAMPLE 1

One hundred parts by weight water is heated to 180°C., 50 parts by weight corn grits and 0.028 part by weight carboxymethylcellulose (CMC 7HOF, Herculs, Inc.) along with 0.001 parts vitamins, iron, and BHA are added to the water. Prior to the addition, the corn grits have a particle size such that 17 percent by weight of the grits pass through a U.S. No. 24 screen. The resulting mixture of water, corn grits, and carboxymethylcellulose has a temperature of just under 70°C. This temperature is held constant for about 2 minutes. The heated mixture is then conveyed through a screw conveyor which has been fitted with steam ports and steam is injected into the mixture until its temperature is 95°C. The mixture is taken from the screw conveyor and immediately placed in the trough portion of a drum drier. Within 2 minutes of the time that the mixture reached 95°C. substantially all of the mixture has passed through the nip of the drier. The heated mixture then formed a thin sheet on the internallyheated, rotating double drum drier. The product is then removed in a thin sheet having a thickness of about 0.025 inch and comminuted to the particle size of corn grits. A redeye gravy is prepared by conventional methods and dried to about 15% by weight moisture. This mix is then mixed with an imitation bacon material (a smoked, bacon-flavored, hydrolyzed soy protein resembling chopped fried bacon) and salt in an amount of 12 parts gravy, 12 parts protein (bacon mix) and 5 parts salt. This mix is then mixed with the dried grits in an amount of 94 parts by weight dried grits with 6 parts by weight total protein mix.

EXAMPLE 2

Example 1 is repeated with the exception that the emulsifier is polyoxyethylene sorbitan monostearate (Tween 60, Atlas Chemical Industries, Inc.).

EXAMPLE 3

Example 1 is repeated with the exception that the emulsifier is glyceryl monostearate (Myvaplex Type 600, Distillation Products Industries).

EXAMPLE 4

Example 1 is repeated with the exception that the emulsifier is a mixture of monoglycerides and diglycerides of edible fats, oils and fat-forming fatty acids (Atmos 300, Atlas Chemical Industries, Inc.).

EXAMPLE 5

Example 1 is repeated with the exception that the polysaccharide gum is guar gum (Jaguar J2S1, Stein, Hall and Co., Inc.).

EXAMPLE 6

Example 1 is repeated with the exception that the bacon product is replaced with 3 parts by weight of a ham flavored hydrolyzed soy protein. The ham flavored product is also finely divided to resemble small cubes of baked ham.

EXAMPLE 7

Example 1 is repeated with the exception that the bacon is replaced with about 9 parts by weight of an imitation sausage which has about half flavoring therein with the other half comprising a textured vegetable protein.

EXAMPLE 8

Example 1 is repeated with the exception that the bacon bits are replaced with about 8 parts by weight of cheddar cheese and the gravy is replaced with water and corn starch.

In each of the above examples the product thus produced is an extremely good tasting, high protein vitamin enriched, iron grits product. The product has the appearance and taste of grits mixed with another ingredient. The grits and "meat" product thus produced is the first known example of such a product.

It may thus be seen that a new and unique process which produces a new and useful product and which overcomes the problems left unsolved by the prior art has been invented.

Therefore, it is claimed:

1. A process for producing a fortified nutritional emulsifier free, instant-type food product which upon the addition of water and without need for heating to boiling temperatures acquires the flavor and texture characteristics of cooked corn grits, said process consisting of the steps:
   A. admixing
      1. corn grits;
      2. water, said water being added in an amount sufficient to cause the moisture content to be from 50 percent to 90 percent by weight of the total mixture;
      3. an edible polysaccharide gum capable of rehydrating rapidly with the addition of water, said gum being added in an amount of from 0.5 to 3.5 percent by weight of the finished corn grits product; and
      4. a mixture of vitamins and antioxidant until the total admixture is a slurry;
   B. heating the above mixture in a first heating step, said first heating step comprising heating the mixture to a temperature of from 60°C. to 80°C. and maintaining that temperature for a period of time of from 30 seconds to 30 minutes without substantially gelatinizing the starch in the corn grits;
   C. heating the above heated mixture in a second heating step, said second heating step comprising heating the mixture to a temperature of from 93°C. to 100°C.;
   D. drying the heated mixture in the form of a thin sheet on a drum drier, said drying being substantially accomplished within a time period of up to 2 minutes after the mixture has been heated to the 93°C. to 100°C. temperature range;

E. collecting the dried sheet of product containing discrete particles in a starch-gum matrix and comminuting the dried sheet to form an instant-type corn grits product; and F. forming a moist proteinaceous flavoring material by admixing: 1.) a proteinaceous material having more than 15 percent by weight protein therein, 2.) salt, and 3.) a moisturizing gravy mix; and G. blending the moist proteinaceous flavoring material with the comminuted dry sheet until the blend is dry and with said proteinaceous flavoring material being added in an amount of from 1 percent to 15 percent by weight of the blended product.

2. A process as in claim 1 wherein the proteinaceous material is uncooked cheese.

3. A process according to claim 1 wherein the edible polysaccharide gum that is added is carboxymethyl cellulose.

4. A process according to claim 1 wherein the edible gum that is added is guar gum.

5. A process as in claim 1 wherein the proteinaceous flavoring material is a meat flavored vegetable protein.

6. A process as in claim 4 wherein the vegetable protein is hydrolyzed vegetable protein.

7. A process as in claim 4 wherein the vegetable protein is textured vegetable protein.

8. A product produced by the process as defined in claim 1.

9. A process as in claim 1 wherein the rapid heating step is to a temperature of from 93°C. to 100°C.

* * * * *